United States Patent [19]

Crooks et al.

[11] 3,898,180

[45] Aug. 5, 1975

[54] CATALYST PELLET

[75] Inventors: Donald Anderson Crooks; David George King, both of Stockton-on-Tees, England

[73] Assignee: Imperial Chemical Industries Limited, London, England

[22] Filed: June 25, 1973

[21] Appl. No.: 373,280

Related U.S. Application Data

[63] Continuation of Ser. No. 58,579, July 27, 1970, abandoned.

[30] Foreign Application Priority Data

July 23, 1970  United Kingdom............... 38720/70

[52] U.S. Cl............................... 252/449; 252/477 R
[51] Int. Cl............................................. B01j 11/06
[58] Field of Search......................... 252/449, 477 R

[56] References Cited
UNITED STATES PATENTS 2,408,164   9/1946   Foster ............................. 252/477 R
3,674,680   7/1972   Hoekstra et al................. 252/477 R

FOREIGN PATENTS OR APPLICATIONS 252,531   6/1964   Australia.......................... 75/208 R
656,535   1/1963   Canada............................ 75/208 R
535,906   10/1931  Germany............................. 75/214

*Primary Examiner*—Winston A. Douglas
*Assistant Examiner*—W. J. Shine
*Attorney, Agent, or Firm*—Cushman, Darby & Cushman

[57] ABSTRACT

Shaped catalyst pellets formed with indentations or protrusions provide a better combination of properties, such as, activity per unit volume, pressure drop, bulk density, surface area per unit volume of reactor, than is possible with shaped in present use. The pellets are economic to manufacture at the required mechanical strength. The advantages are obtained especially when the chemical reaction takes place primarily at the external surface of the pellet, for example in hydrocarbon hydrodesulphurisation or in the carbon monoxide shift reaction.

6 Claims, 5 Drawing Figures

PATENTED AUG 5 1975  3,898,180
SHEET 1
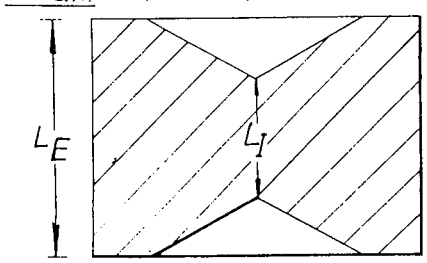
FIG.1
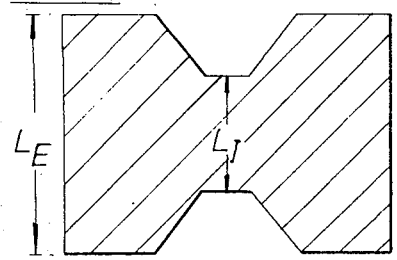
FIG.2
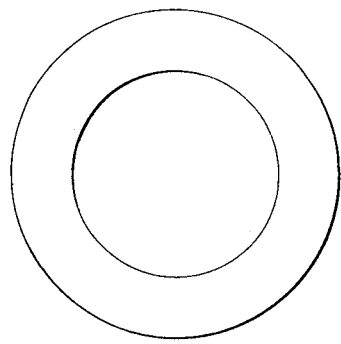
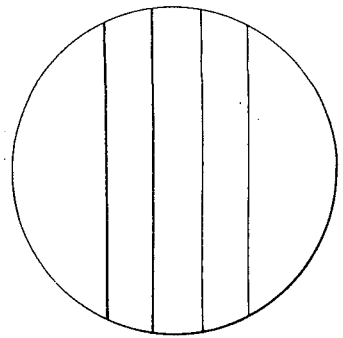
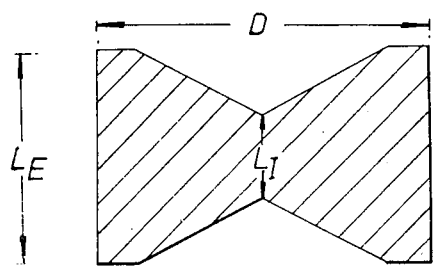
FIG.3
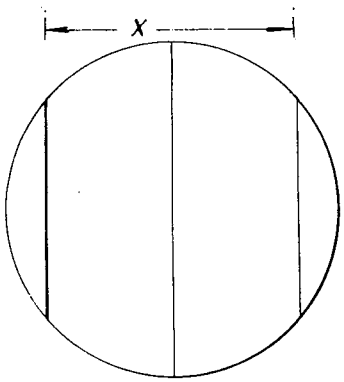
Inventors
DONALD ANDERSON CROOKS
DAVID GEORGE KING
By
Cushman, Darby & Cushman
Attorneys

PATENTED AUG 5 1975

3,898,180

SHEET 2

Inventors
DONALD ANDERSON CROOKS
DAVID GEORGE KING
By
Cushman, Darby & Cushman
Attorneys

CATALYST PELLET

This is a continuation of application Ser. No. 58,579 filed July 27, 1970, now abandoned.

The invention relates to catalyst pellets.

Some gaseous reactions which involve solid catalysts in the form of pellets are limited by diffusion of reactants into the pellet and of the products out of the pellet. Such reactions therefore tend to occur preferentially near to the external surface of the pellet. Hence there is an advantage in making pellets having a high surface area to volume ratio. This can be achieved by making small pellets; however, there is a practical lower limit to the size of the pellets since as their size decreases the pressure drop required to pump the gas through the bed increases. It is also more expensive to make very small pellets. Increased surface area to volume ratio and decreased pressure drop can be obtained by the use of ring-shaped pellets, but their manufacturing cost is greater than that of simple cylindrical pellets, and mechanical considerations limit the size to rather large rings.

It has not been found that pellets having indentations or protrusions make possible a better combination of properties than is obtained using the usual shapes.

According to the invention there is provided a shaped catalyst pellet having at least one indentation or protrusion formed on at least one of its surfaces.

According to a preferred embodiment of the invention, there is provided a catalyst pellet in the form of a cylinder with at least one indentation or or protrusion formed preferably on one or each of its ends.

These pellets can be manufactured almost as easily and cheaply as can simple cylindrical pellets, by using pelleting machine punches having correspondingly raised or depressed portions on their compacting faces.

The volume of an indented pellet is less and its external surface area is greater than that of a plane-ended right cylindrical pellet of the same overall length and diameter. When packed into a reactor, the weight of indented pellets needed to fill the reactor is less than that of simple cylindrical pellets of the same solid density, and the cost is consequently less. As the surface area of the pellets in the reactor is increased, so the efficiency of the reactor is increased for diffusion-limited reactions. Also the catalyst bed has a greater voidage and therefore the pressure drop is less than that through a bed of plane-ended cylindrical pellets.

With a protrusioned catalyst pellet the surface area to volume ratio does not differ very substantially in relation to the plane-ended pellet. However when such pellets are packed into a reactor there is an increase in the voidage because the protrusions keep the pellets further apart; as a result, the weight and hence the cost of catalyst occupying unit volume of reactor is reduced.

There are five different configurations of pellet possible when considering a maximum of one indentation or protrusion per end. Two of these are pellets with one end flat, and the other end having an indentation or a protrusion. Another two possibilities are pellets with an indentation or a protrusion on each end, and the fifth possibility is a pellet with an indentation in one end and a protrusion on the other. The shapes of the opposite ends need not be indentical. There are of course other possible configurations if the number of indentations or protrusions on one or both ends is increased. These indentations or protrusions may be, for example, in the form of segments of spheres, cones, frusto-cones, grooves (or ridges in the case of protrusions), annular grooves and rectangular prisms. Such a ridge or groove can be linear or branched and may be for example in a three-spoked pattern.

It is to be understood that the sectional forms of indentations or protrusions include also forms which are rounded-off at sharp edges or corners, for example, to facilitate manufacture or increase wear-resistance.

A very useful pellet has one flat end and one end formed with a shallow conical depression, the depth of which is between 0.2 and 0.5 of its diameter.

The shapes of the cylindrical pellets according to this invention can be defined by means of a number of parameters, of which $L_E$ is the overall height of the pellet measured from its extremities including any protrusions. $L_I$ is the length of solid-filled volume over which the cross-sectional area perpendicular to the axis is $\frac{1}{4}\pi D^2$ and the diameter is D. X represents the width of the indentation or protrusion as shown in the accompanying drawings.

The invention is especially applicable to pellets in which the ratio $$\frac{L_E}{D}$$

is between 2 and 0.5 to 1 and preferably between 1.5 and 0.5 to 1 and, within this generalisation, in order to obtain a preferred level of improvement in the effectiveness of the catalyst the dimensions of the catalyst pellets according to the invention should be such that:
i. the ratio $$\left(\frac{L_E - L_I}{D}\right)$$

is greater than 0.25; and that
ii. $L_I$ is in the range 0.05D to 0.40D, or where possible up to 0.6D.

The invention is especially applicable to pellets in the size range of 1.5 to 10 mm (length and diameter) and preferably 1.5 to 7mm, since at these sizes it is not usually practicable to make catalyst in the form of rings. Nevertheless, it has advantages for larger sizes, since cylinder-pelleting is mechanically simpler than ring-pelleting.

The invention provides also a method of making catalyst pellets which comprises compressing catalyst constituent material in a die by two punches which have faces profiled complementarily to the shape of the pellets according to the invention.

The shapes of the indentations or protrusions, as required for chemical process reasons, are possible while observing considerations of convenience in fabricating the pelleting machine punches for the pellets, and the main manufacturing considerations in choice of pellet shape are (1) that the punches shall be profiled such that they do not clog up in use (2) that projections on the punches shall not damage the pellets as they are removed from the lower punch, and (3) that no portion of the powder in the die shall be under-compacted.

These manufacturing requirements can be met by a variety of pellet shapes which offer possibilities for optimising the surface area to volume ratio. In the case of grooved or ridged pellets, the relative orientations of the upper and lower punches may be fixed to give grooves or ridges in any desired relative orientation or may be allowed or caused to rotate, giving a mutual orientation which varies as between the pellets of a batch of catalyst. A catalyst bed comprising such a batch of pellets is a further feature of the invention.

Slightly conical pellets, in which the diameter (D) varies from one end to the other are within the scope of the invention.

For convenience in manufacture it is preferred that the pellets should have one end flat and the other shaped; these are made by a method which uses an upper profiled punch and a lower flat punch. In the case of pellets with rectangular indentations or protrusions these present technical problems during manufacture since the rectangular punch soon becomes worn at its corners.

The invention is applicable to the generality of materials in use in making catalysts for heterogeneous reactions, for example support materials such as the difficultly reducible oxides of Groups II to IV of the Periodic Table including hydraulic cements, catalytically active oxides such as silica, alumina and oxides from Groups V–VIII of the Periodic Table, and metals from Group IB and VIII of the Periodic Table. Especially useful catalysts are those containing cobalt and molybdenum oxides, and copper and zinc oxides. The constituents may be all present at the time of shaping or may be partly added afterwards, for example, by impregnation.

Examples of five preferred shapes of cylindrical pellets are shown in FIGS. 1–5 of the accompanying drawings.

FIG. 1 is a sectional view together with a plan of a pellet with conical depressions in opposite faces.

FIG. 2 is a sectional view together with a plan of the pellet with flat-bottomed grooves in opposite faces.

FIG. 3 is a sectional view together with a plan of the pellet with V-shaped grooves in opposite faces.

TABLE 1

Figure 4:
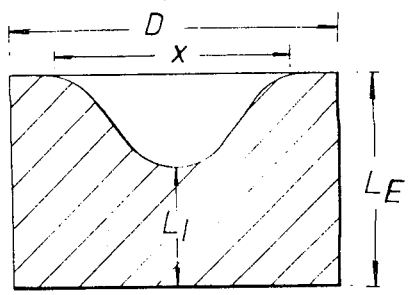
FIG. 4 is a sectional view together with a plan of the pellet with a single indentation in the upper surface.
Figure 5:
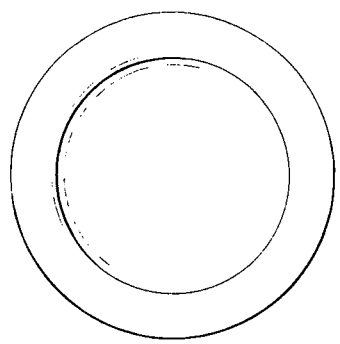
FIG. 5 shows three views of a pellet with a trapezoidal ridge on its upper surface and a trapezoidal depression in its lower surface of which
 i. is a front-elevation of the pellet.
 ii. is a side-elevation of the pellet.
 iii. is a plan view of the pellet.
Figure 5:
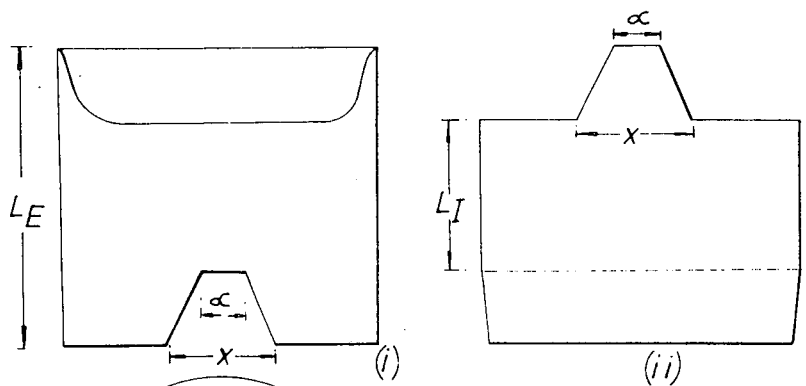
Figure 5:
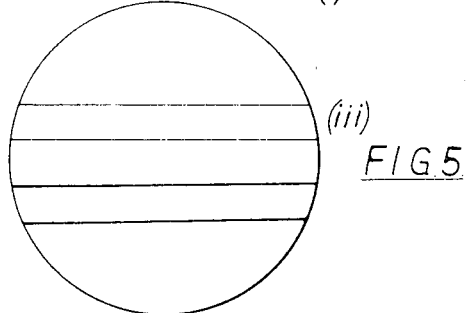

| (i) Dimensions of pellets shown in FIGS. 1–5. | Pellets with conical indentation (FIG. 1) (i) | Pellets with conical indentation (FIG. 1) (ii) | Pellet with flat-bottomed grooves (FIG. 2.) | Pellet with V-shaped grooves. (FIG. 3.) | Pellet with single indentation. (FIG. 4.) | Pellet with groove & ridge. (FIG. 5.) |
|---|---|---|---|---|---|---|
| $\left(\dfrac{L_E - L_I}{D}\right)$ | 0.53 | 0.6 | 0.296 | 0.41 | 0.3 | 0.47 |
| $\left(\dfrac{L_E}{D}\right)$ | 0.67 | 0.67 | 0.794 | 0.67 | 0.67 | 0.94 |
| $\left(\dfrac{L_I}{D}\right)$ | 0.14 | 0.07 | 0.498 | 0.26 | 0.37 | 0.47 |
| Length X relative to diameter (D). | 0.635 | 0.898 | 0.443 | 0.621 | 0.72 | 0.294 groove 0.571 ridge |
| Width of groove or ridge (α) relative to X (where applicable) | not applicable | not applicable | 0.148 | not applicable | not applicable | 0.075 groove 0.179 ridge |
| (ii) DATA Relative volume per pellet | 89% | 76% | 87.5% | 76% | 92% | 79% |
| Relative external surface area per pellet | 105% | 107% | 105% | 103% | 104% | 88% |
| Relative weight of catalyst per unit volume of reactor | 91% | 81% | 95.8% | 92% | 91% | 104% |
| Relative external surface area per unit volume of reactor. | 107% | 115% | 115% | 125% | 103% | 116% |
| Relative pressure drop. | 89% | 77% | 84% | 81% | 99% | 95% |

Data on the pellets shown in FIGS. 1–5 are given in Table 1.

The properties of the shapes given in Table 1 are relative to plane ended pellets of the same overall length ($L_E$) and diameter (D).

From Table 1 it is evident that there is a decrease in the weight of catalyst required to fill a given volume, except for the pellet with a groove and ridge, and hence a decrease in cost. The external surface area of pellets per unit volume of reactor is increased and therefore the activity of the catalyst is increased for a diffusion limited reaction. Also the pressure drop required to pump the gaseous reactants through the catalyst bed at the same velocity is decreased.

It is also apparent that the maximum decrease in volume per pellet is given by pellets with conical indentations and V-shaped grooves. The maximuum increase in relative external surface area per pellet is given by one of the pellets with conical indentations, and this is greater than for pellets with V-shaped grooves owing to the loss of surface area at the ends of the grooves. However, the maximum increase in the relative external surface area per unit volume of reactor (25%) is given by the pellet with V-shaped grooves.

The relative weight of catalyst per unit volume is less for the conical indented pellet than the V-grooved pellet, since the grooved pellets interlock with each other while the conical indentations do not interact significantly. Interlocking of grooves increases the number of pellets per unit volume and thus the relative surface area per unit volume. The maximum reduction in pressure drop (23%) is obtained with one of the conically indented catalyst pellets.

Faced with a choice between an indented or protrusioned catalyst for a given process, since neither of these catalyst pellets possesses all the desirable characteristics, namely, increased surface area, reduced pressure drop and decrease in weight of catalyst per unit volume of reactor, it is necessary to decide which of these parameters are of greatest improtance when choosing a catalyst for a specific process. It will be appreciated that the ordinary values of mean horizontal or vertical crushing strength as applied to cylindrical pellets are not correlated with mechanical behaviour in plant use in the same way as for cylindrical pellets, owing to the different mode of packing of the pellets according to the invention.

On this basis, the pellet with conical indentations, giving the greatest reduction in catalyst weight and in pressure drop, would be chosen for catalysts containing expensive raw materials used in pressure-drop limited reactors. The grooved pellets, giving the greatest increase in surface area, would be chosen for catalysts which are most heavily diffusion limited and would benefit most in increased activity from the area improvement.

PROCESS EXAMPLE 1

Desulphurisation of Naphtha

A desulphurisation catalyst containing 2.8 ± 0.3% CaO, 12 ± 0.1% $MoO_3$ and 4.5 ± 0.5% MgO supported on alumina was pelleted to produce (a) plane ended pellets and (b) indented pellets of the type shown in FIG. 4 with a pellet density of 0.8 ± 0.05 gm/cc. The pellets were 3.6 mms high × 5.4 mm in diameter. The activities of these pellets were compared under identical operating conditions i.e. 450 p.s.i.g, 370°C, hydrogen : hydrocarbon mole ratio of 0.25 and liquid space velocity of 1 hour$^{-1}$. The feedstock was desulphurised naphtha (boiling range 30°–170°C) doped with thiophene to a concentration of 100 ppm w/v sulphur. In this test the exit concentration of sulphur was 0.4 ppm (indented pellets) and 1.15 ppm (plane pellets).

Under these conditions it is apparent that this reaction is pore-diffusion limited and the degree of sulphur removal increases with increasing geometrical surface area of the pellets.

PROCESS EXAMPLE 2

Low Temperature CO Shift Conversion

This catalyst was used for the conversion of carbon monoxide and water vapour to hydrogen and carbon dioxide at temperatures from 200° to 250°C. In the unreduced state the composition of the catalyst was 32% CuO, 54% ZnO, 14% $Al_2O_3$.

Plane ended pellets and three sets of shaped pellets (conical indentations of the type shown in FIG. 1 at each end, V-shaped grooves of the type shown in FIG. 3 at each end, and a conical indentation at one end with a V-shaped groove at the other), of dimensions 5.4 mm dia. × 3.6 mm overall length were made to constant pellet density (1.4 ± 0.02 gm/cc). Two tests were carried out, (a) using a 20 g sample of each and (b) using a 25 ml sample of each. Each sample was reduced with 2% $H_2$ in $N_2$ at 230°C, and then tested for activity at atmospheric pressure, 230°C, steam/dry gas ratio of 0.5, and isothermal reactor conditions. The inlet dry gas, containing 15% $CO_2$, 5% CO and 80% $H_2$, was passed over the catalyst at a dry gas rate of 300 l/hr. Under these conditions the activities of each type, expressed in arbitrary units of gas conversion per unit weight or volume of catalyst were as follows:

| | Plane-ended | Double indentation | Double groove | Indentation/groove |
|---|---|---|---|---|
| Activity per unit weight of bed. | 9.1 | 12.5 | 11.4 | 11.4 |
| Activity per unit volume of bed. | 12.3 | 12.9 | 12.8 | 13.0 |
| Bulk density | 0.85 | 0.74 | 0.75 | 0.73 |

It is evident that the activity is usefully greater, even when using a constant volume of catalyst, and hence the catalyst cost is substantially less.

Among other processes which may be carried out using the catalyst according to the invention there may be mentioned hydrocarbon-steam gasification reactions such as the various types of steam reforming, high-temperature carbon monoxide shift, methanation of traces of carbon oxides in hydrogen, ammonia synthesis, methanol synthesis, hydrogenations and hydrocarbon isomerisations.

We claim:

1. A shaped catalyst pellet in the form of a cylinder having at least one indentation or protrusion formed on at least one of its end surfaces, said catalyst pellet being made from materials selected from the group consisting of oxides of Group II to Group VIII metals, metals from Group IB and Group VIII of the Periodic Table, hydraulic cements, silica and alumina, said pellet being one in which the ratio $$\left(\frac{L_E - L_I}{D}\right)$$

is greater than 0.25 and $L_I$ is between 0.05 D and 0.6 D, where $L_E$ is the overall height of the pellet measured from its extremities, $L_I$ is the length of solid-filled volume over which the cross-sectional area perpendicular to the axis is $\frac{1}{4}\pi D^2$ and the diameter is D, the ratio $L_E/D$ being between 2.0 and 0.5 to 1 and D having a value of 1.5 to 10 mm.

2. A catalyst pellet according to claim 1 in which at least one indentation is conical or frusto-conical.

3. A catalyst pellet according to claim 1 in which an indentation is in the form of a groove.

4. A catalyst pellet according to claim 1 in which a protrusion is in the form of a ridge.

5. A catalyst pellet according to claim 1 having a length and diameter less than 10 mm.

6. A catalyst bed comprising a mixture of cylindrical catalyst pellets each formed with at least two end surfaces, each surface having at least one irregularity which is a groove or ridge, wherein each component of the mixture consists of pellets having a like orientation of the irregularity on one surface with respect to that on another surface, and the orientation is different in other components of the mixture, said catalyst pellets being made from materials selected from the group consisting of oxides of Group II to Group VIII metals, metals from Group IB and Group VIII of the Periodic Table, hydraulic cements, silica and alumina, said pellet being one in which the ratio $(L_E-L_I/D)$ is greater than 0.25 and $L_I$ is between 0.05D and 0.6D, where $L_E$ is the overall height of the pellet measured from its extremities, $L_I$ is the length of solid-filled volume over which the cross-sectional area perpendicular to the axis is $\frac{1}{4}\pi D^2$ and the diameter is D, the ratio $L_E/D$ being between 2.0 and 0.5 to 1 and D having a value of 1.5 to 10 mm.

* * * * *